United States Patent
Lasalandra et al.

(10) Patent No.: US 7,802,476 B2
(45) Date of Patent: Sep. 28, 2010

(54) FREE FALL DETECTOR DEVICE AND FREE FALL DETECTION METHOD

(75) Inventors: Ernesto Lasalandra, San Donato Milanese (IT); Tommaso Ungaretti, Pavia (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 353 days.

(21) Appl. No.: 11/625,124

(22) Filed: Jan. 19, 2007

(65) Prior Publication Data
US 2007/0188969 A1 Aug. 16, 2007

(30) Foreign Application Priority Data
Jan. 20, 2006 (EP) ................................ 06425026

(51) Int. Cl.
*G01P 15/125* (2006.01)
(52) U.S. Cl. ..................... 73/514.32; 324/661
(58) Field of Classification Search ............ 73/510, 73/514.18, 514.32; 702/141; 360/75; 324/661
See application file for complete search history.

(56) References Cited

U.S. PATENT DOCUMENTS

| 4,054,833 | A  | * | 10/1977 | Briefer ....................... 324/679 |
| 6,856,144 | B2 | * | 2/2005  | Lasalandra et al. .......... 324/661 |
| 7,078,916 | B2 | * | 7/2006  | Denison ..................... 324/661 |
| 7,562,573 | B2 | * | 7/2009  | Yazdi ....................... 73/514.32 |

FOREIGN PATENT DOCUMENTS

EP 1 278 068 1/2003

* cited by examiner

*Primary Examiner*—John E Chapman
(74) *Attorney, Agent, or Firm*—Lisa K. Jorgenson; Thomas J. Satagaj; Seed IP Law Group PLLC

(57) ABSTRACT

A free-fall detector device includes an inertial sensor, a detection circuit associated to the inertial sensor, and a signal source for supplying a read signal to the inertial sensor. The device moreover includes: a storage element, selectively connectable to the detection circuit for storing a feedback signal generated by the detection circuit in response to the read signal supplied to the inertial sensor; and a feedback circuit coupled to the storage element for supplying the feedback signal to the inertial sensor so that the detection circuit generates at least one detection signal in response to the feedback signal supplied to the inertial sensor.

29 Claims, 7 Drawing Sheets

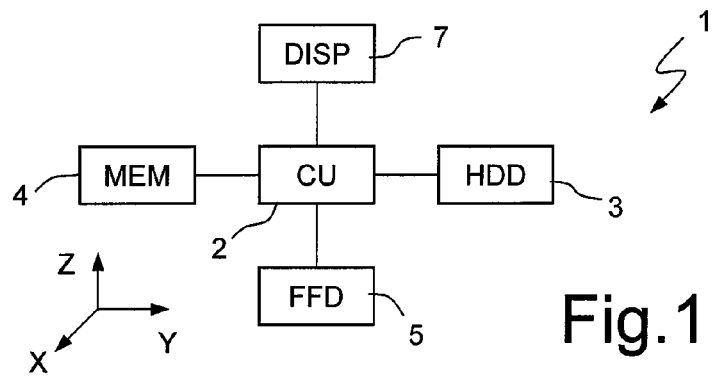
Fig.1
Fig.2
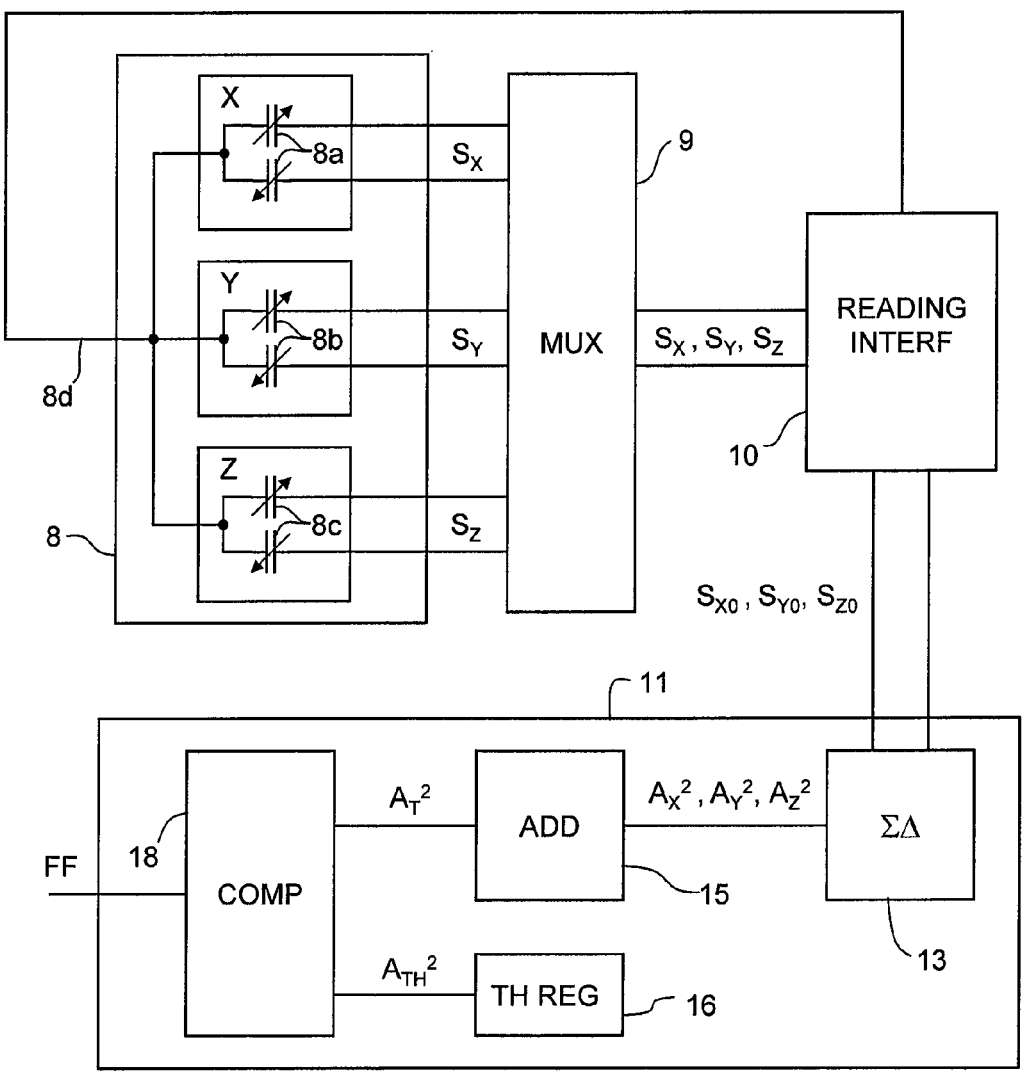

FREE FALL DETECTOR DEVICE AND FREE FALL DETECTION METHOD

BACKGROUND OF THE INVENTION

1. Field of the Invention

The present invention relates to a free-fall detector device for and to a free-fall detection method.

2. Description of the Related Art

As is known, the use of microelectromechanical or MEMS (Micro-Electro-Mechanical-Systems) inertial sensors is becoming increasingly common for different reasons in a wide range of portable electronic devices, such as cell phones, laptops and palmtops, camcorders, digital cameras, and the like. In these devices, in particular, the inertial sensors are often advantageously exploited for making free-fall detectors, which enable prevention or at least reduction of the damage deriving from impact by bringing sensitive parts into a safety configuration. Owing to the increasingly marked miniaturization, for example, many of the devices listed above are equipped with hard disks, which call for an extremely high mechanical precision and have very delicate parts. The surfaces of the disks and the read/write heads, in use, are practically in contact and can be seriously damaged as a result of impact caused by a fall. A free-fall detector in many cases enables the read/write heads to be moved away from the surfaces of the disks in due time and then to be parked in a safety area before the electronic device completes its fall. Upon impact, then, the likelihood of serious damage occurring is considerably reduced.

Clearly, the effectiveness of a free-fall detector depends upon the precision and the speed in detecting the falling condition.

In this connection, it should be recalled that inertial sensors of the types used in free-fall detectors can detect not only accelerations and decelerations of the device in which they are incorporated, but also the intensity of the action of the gravitational field with respect to one or more detection axes. When the device is in rest conditions, said intensity will evidently be all the greater, the closer the direction of the detection axis approaches the vertical (i.e., parallel to the acceleration of gravity). Instead, the intensity of the action of the gravitational field is substantially zero if the detection axis is horizontal. However, when a device incorporating an inertial sensor is in a free-fall state, the acceleration detected is substantially zero irrespective of the direction of the detection axis.

Consequently, known free-fall detectors normally use microelectromechanical inertial sensors with three independent axes so as to be sensitive to accelerations in whatever way oriented, and the criterion used for detecting free fall is that the value of the detected acceleration is lower than a threshold value irrespective of the direction.

In greater detail, in a first known type of free-fall detector, three acceleration signals corresponding to the acceleration components according to the three detection axes are continuously converted into numeric signals and supplied to the processing unit. Here the numeric signals are squared and summed together. Then, the processing unit extracts the square root of the sum, which represents the total acceleration value to which the free-fall detector is subjected (and hence also a device that incorporates said free-fall detector), and compares the total acceleration with a threshold close to zero. If the absolute value of the total acceleration is lower than the threshold value, a free-fall condition is signaled. Free-fall detectors of this type are very precise because the exact value of the magnitude of the total acceleration is determined, but are slow in so far as numerous calculations are required (squaring, summation, extraction of square root, comparison). Furthermore, the computation resources are markedly exploited because the acceleration must be continuously monitored. Consequently, conflicts or slowing-down of operations may occur if the processing unit is shared with the device that incorporates the free-fall detector. To prevent conflicts and slowing-down, it is necessary to provide an independent processing unit, which, however, entails a considerable waste of space.

In a second known type of free-fall detectors, which is also based upon inertial microelectromechanical sensors with three independent detection axes, the signals acceleration according to each of the detection axes are converted into numeric signals and compared directly and separately with a threshold close to zero. The free-fall condition is detected when the numeric signals for the three detection axes are all lower than the threshold.

In this case, the calculation speed is favored (only three operations of comparison with a threshold are necessary), at the expense, however, of precision. In fact, the absolute value of the total acceleration is not calculated, and the separate comparisons are reliable only when the total acceleration is substantially parallel to one of the detection axes. Otherwise, a total acceleration with absolute value clearly greater than the threshold value (indication contrary to the free-fall condition) may have components according to the detection axes separately lower than the threshold itself. The free-fall detector could hence respond by signaling a false free-fall condition (false positive). To prevent an excessive number of false positives very low thresholds can be used, but by so doing the sensitivity decreases.

In any case, the threshold is anisotropic in space.

BRIEF SUMMARY OF THE INVENTION

One embodiment of the present invention is a free-fall detector device and a free-fall detection method, which enables the drawbacks described to be overcome.

According to one embodiment of the present invention, a free-fall detector device includes an inertial sensor; a detection circuit associated to the inertial sensor; a signal source, for supplying a read signal to the inertial sensor; a storage element, selectively connectable to the detection circuit for storing a feedback signal, generated by the detection circuit in response to the read signal supplied to the inertial sensor; and a feedback circuit coupled to the storage element for supplying the feedback signal to the inertial sensor, so that the detection circuit generates at least one detection signal in response to the feedback signal supplied to the inertial sensor.

BRIEF DESCRIPTION OF THE SEVERAL VIEWS OF THE DRAWINGS

For a better understanding of the invention, some embodiments thereof will be now described, purely by way of non-limiting example and with reference to the attached plate of drawings, wherein:

FIG. 1 is a simplified block diagram of a portable electronic device incorporating a free-fall detector device;

FIG. 2 is a block diagram of a free-fall detector device in accordance with a first embodiment of the present invention;

DETAILED DESCRIPTION OF THE INVENTION

Figure 3:
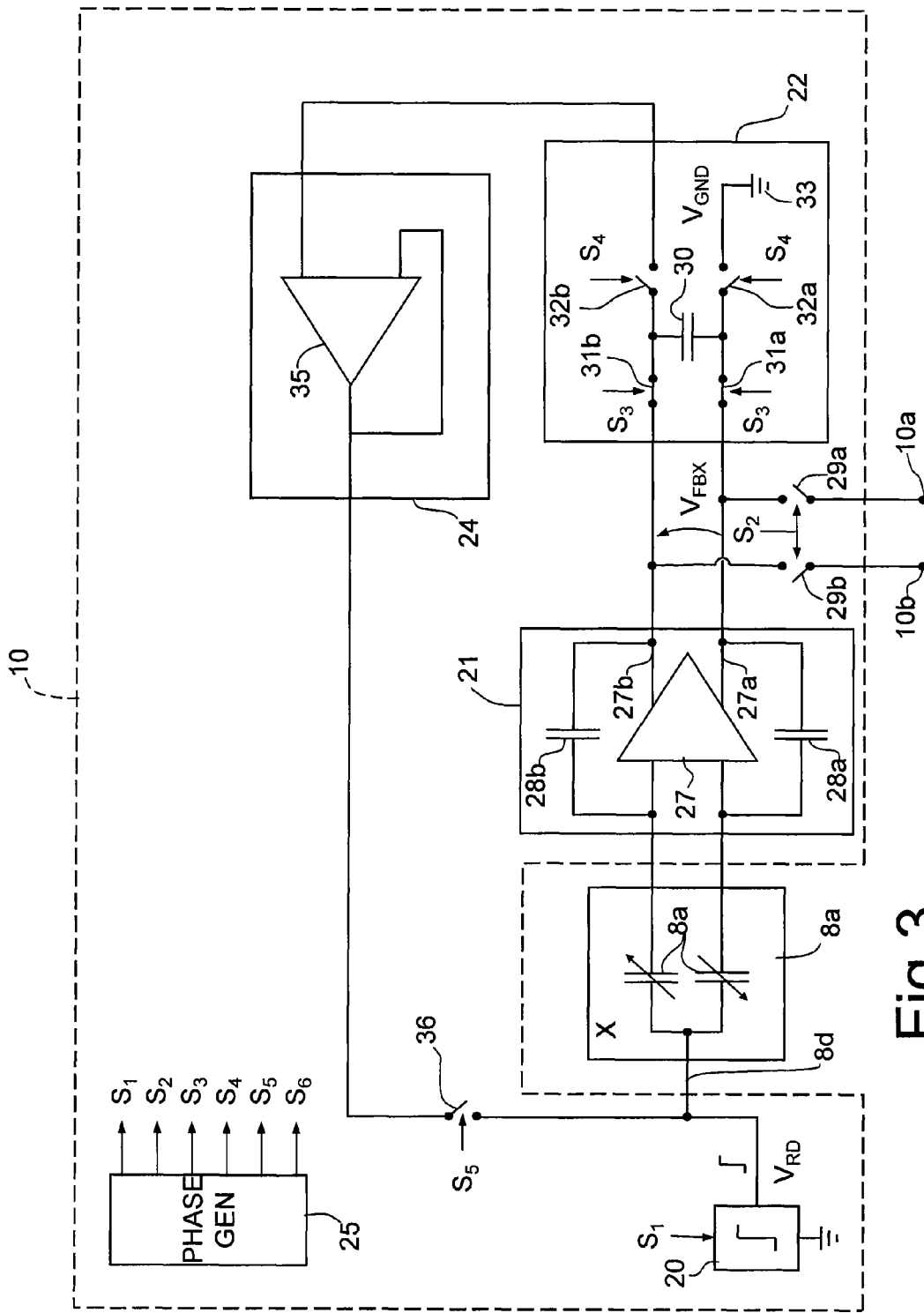
FIGS. 3 and 4 are simplified electrical circuit diagrams of a part of the free-fall detector device of FIG. 2, in a first and, respectively, a second operating configuration.

FIG. 1 illustrates a portable electronic device, in particular a palmtop computer 1. The example described hereinafter must not, however, be considered limiting, since the invention can be used in any type of portable electronic device, such as laptops, cell phones, digital cameras and camcorders, and the like.

The palmtop 1 comprises at least a control unit 2, a hard-disk drive 3, used as bulk storage device, working-memory banks 4, a free-fall detector 5, and a display 7, all connected to the control unit 2.

In particular, the free-fall detector 5 generates a free-fall signal FF, which, in the case of free fall of the palmtop 1, switches from a first value (rest or guided motion) to a value of (free fall). In response to the switching of the free-fall signal FF, the control unit 2 immediately suspends the operations of sensitive elements of the computer 1, sending these elements into a safety configuration. For example, read/write operations of the hard-disk drive 3 are interrupted and the read/write heads (herein not illustrated) are parked, in a way in itself known, in a safety position. The control unit 2 is configured to respond in the shortest time possible to the switching of the free-fall signal FF from the first value to the second value, for example by an interrupt with a high priority level.

With reference to FIG. 2, the free-fall detector 5 comprises an inertial sensor 8, a multiplexer 9, a reading interface 10 associated to the inertial sensor 8, and a processing stage 11.

The inertial sensor 8 is a linear accelerometer of a differential capacitive MEMS type having a first detection axis X, a second detection axis Y, and a third detection axis Z, which are mutually perpendicular and independent.

The inertial sensor 8 comprises microelectromechanical structures having elastically movable parts capacitively coupled to fixed parts. In FIG. 2, the inertial sensor 8 is schematically represented by a first pair of capacitors 8a, a second pair of capacitors 8b, and a third pair of capacitors 8c, which have variable capacitance in response to forces and accelerations acting on the inertial sensor 8 according to the first, second, and third detection axes X, Y, Z, respectively. More precisely, the inertial sensor 8 responds to stresses that cause displacements of the movable parts with respect to the fixed parts according to the first, second or third detection axis X, Y, Z and thus produce capacitance variations of the corresponding pairs of capacitors 8a, 8b, 8c. The capacitance variations of the first, second and third pairs of capacitors 8a, 8b, 8c are moreover of a differential type. In practice, the capacitors of the first, second and third pairs of capacitors 8a, 8b, 8c have the same capacitance at rest $C_S$, in the absence of loads, and show capacitance variations $\Delta C_S$ of equal amplitude and opposite sign when the inertial sensor 8 is loaded, respectively, according to the first, second and third detection axes X, Y, Z. Furthermore, each pair of capacitors 8a, 8b, 8c has one terminal in common, connected to a drive terminal 8d of the inertial sensor 8.

In response to read voltages $V_{RD}$ and feedback voltages $V_{FB}$, supplied by the reading interface 10, the inertial sensor 8 supplies a first raw acceleration signal $S_X$, a second raw acceleration signal $S_Y$, and third raw acceleration signal $S_Z$, respectively, determined by the capacitance variations $\Delta C_S$ of the first, second and third pairs of capacitors 8a, 8b, 8c. In the embodiment described herein, the first, second and third raw acceleration signals $S_X$, $S_Y$, $S_Z$ are in the form of charge packets, which are independently transferred from the first, second and third pairs of capacitors 8a, 8b, 8c to respective inputs of the reading interface 10 sequentially and in a cyclic way through the multiplexer 9.

The reading interface 10 converts the first, second, and third raw acceleration signals $S_X$, $S_Y$, $S_Z$, respectively, into a first detection signal $S_{XO}$, a second detection signal $S_{YO}$, and a third detection signal $S_{ZO}$. As explained in greater detail hereinafter, the first, second, and third detection signals $S_{XO}$, $S_{YO}$, $S_{ZO}$ are proportional to the square of the magnitude of a first, second and third acceleration component detected by the inertial sensor 8, respectively, according to the first, second, and third detection axes X, Y, Z.

The processing stage 11 comprises an analog-to-digital or A/D converter 13, an adder register 15, a threshold register 16, and a comparator 18.

The A/D converter 13, of a sigma-delta type, receives in succession the first, second, and third detection signals $S_{XO}$, $S_{YO}$, $S_{ZO}$ from the reading interface 10 and converts them in order into a first, second, and third quadratic acceleration value $A_X^2$, $A_Y^2$, $A_Z^2$ (note that the A/D converter 13 merely performs the analog-to-digital conversion and hence the "translation" into digital words, whereas raising to a power is not required: in fact, the first, second and third detection signals $S_{XO}$, $S_{YO}$, $S_{ZO}$ are intrinsically proportional to the square of the respective acceleration components). The adder register 15 temporarily stores and then adds the first, second, and third quadratic acceleration values $A_X^2$, $A_Y^2$, $A_Z^2$, to calculate a quadratic value of total acceleration $A_T^2$, corresponding to the square of the magnitude of a total acceleration $A_T$ acting on the inertial sensor 8.

The comparator 18 receives, on its inputs, the total quadratic value $A_T^2$ and a threshold quadratic value $A_{TH}^2$, stored in the threshold register 16 and generates the free-fall signal FF. More precisely, the free-fall signal FF has the first value (rest or guided motion) if the total quadratic value $A_T^2$ is greater than the threshold quadratic value $A_{TH}^2$, and the second value (free fall) otherwise.

With reference to FIG. 3, the reading interface 10 comprises a signal source 20, a charge-voltage converter 21, a hold stage 22, a buffer stage 24, and a phase-generator circuit 25, which supplies a plurality of clock signals $S_1$-$S_6$. In particular, in FIG. 3 the multiplexer 9 connects the interface 10 to the first pair of capacitors 8a. For reasons of convenience, second and third pairs of capacitors 8b, 8c are not illustrated herein; however, in successive read steps second and third pairs of capacitors 8b, 8c are sequentially connected to the reading interface 10 and are arranged in a configuration identical to the one illustrated in FIG. 3 for the first pair of capacitors 8a.

The signal source 20 is connected to the driving input 8d of the inertial sensor 8 and is driven by a first clock signal $S_1$, so as to supply a step read voltage $V_{RD}$ at pre-determined reading instants.

The charge-voltage converter 21 comprises a fully differential switched-capacitor charge amplifier 27, having a first integration capacitor 28a, connected between a first input and a first output 27a, and a second integration capacitor 28b, connected between a second input and a second output 27b. The inputs of the charge amplifier 27 are cyclically connected to the first, second, and third pairs of capacitors 8a, 8b, 8c through the multiplexer 9 (in the case of FIG. 3, the inputs of the charge amplifier 27 are connected to respective terminals of the first pair of capacitors 8*a*). The first and second outputs 27*a*, 27*b* of the charge amplifier 27 are selectively connectable to a first output terminal 10*a* and a second output terminal 10*b* of the reading interface 10 through a first output switch 29*a* and, respectively, a second output switch 29*b*, which are simultaneously driven by a second clock signal $S_2$.

The hold stage 22 comprises a hold capacitor 30. A first terminal of the hold capacitor 30 is selectively connectable to the first output 27*b* of the charge amplifier 27 through a first hold switch 31*b* and to the buffer stage 24 through a first feedback switch 32*b*. A second terminal of the hold capacitor 30 is selectively connectable to the second output 27*a* of the charge amplifier 27 through a second hold switch 31*a* and to a ground line 33 through a second feedback switch 32*a*. Furthermore, the hold switches 31*a*, 31*b* are driven by a third clock signal $S_3$, and the feedback switches 32*a*, 32*b* are driven by a fourth clock signal $S_4$.

On the ground line 33, there is a ground voltage $V_{GND}$.

In the embodiment described herein, the buffer stage 24 comprises a voltage follower 35, having its input connected to the first terminal of the hold capacitor 30 through the first feedback switch 32*b* and its output connected to the drive terminal 8*d* of the inertial sensor 8 through a third feedback switch 36. The third feedback switch 36 is driven by a fifth clock signal $S_5$.

Reading of the sensor 8 envisages two iterations for each of the detection axes X, Y, Z. Hereinafter, for reasons of simplicity only the reading of the first detection axis X will be described, since reading of the other detection axes is substantially identical.

Initially, a reset step is performed in a known way (not illustrated), in which pre-determined voltage levels are imposed on the inputs 27*a* and on the outputs 27*b* of the charge amplifier 27. Furthermore, the hold capacitor 30 is completely discharged.

Next (FIG. 3), the signal source 20 supplies the read voltage $V_{RD}$ upon a command imparted through the first clock signal $S_1$. The read voltage $V_{RD}$ is a step voltage of pre-determined amplitude. Furthermore, the hold switches 31*a*, 31*b* are in the closed condition, whereas the feedback switches 32*a*, 32*b* are in the open condition. Consequently, the hold capacitor 30 is connected between the first output 27*a* and the second output 27*b* of the charge amplifier 27 and disconnected from the buffer stage 24.

In response to the read voltage $V_{RD}$, the first pair of capacitors 8*a* of the sensor 8 supplies (or absorbs) differential charges $Q_{AX}$, $Q_{BX}$ to (from) the charge amplifier 27, which converts them into a feedback voltage $V_{FBX}$. As is known, a charge amplifier associated to a differential capacitive inertial sensor driven by a step voltage supplies at output a voltage that is proportional both to the amplitude of the voltage step, and to the capacitance variations of the inertial sensor. Furthermore, the capacitance variations are correlated, in a substantially linear way, to the acceleration according to the detection axis of the sensor. Consequently, designating by $\Delta C_{SX}$ the capacitance variations associated to the first pair of capacitors 8*a* of the inertial sensor 8 and by $K_1$ a first constant of proportionality, the feedback voltage $V_{FBX}$ is given by $$V_{FBX}=K_1*V_{RD}*\Delta C_{SX} \quad (1)$$

Furthermore, $$\Delta C_{SX}=K_2*A_X \quad (2)$$

where $K_2$ is a second constant of proportionality and $A_X$ is the acceleration component according to the first detection axis X.

The feedback voltage $V_{FBX}$ is stored on the hold capacitor 30, which is connected between the first output 27*a* and the second output 27*b* of the charge amplifier 27. In this step, the output switches 29*a*, 29*b* are in the open condition, and hence the charge amplifier 27 is disconnected from the processing stage 11.

The second iteration envisages an initial reset step (not illustrated), in which the drive terminal 8*d* of the inertial sensor 8 is brought to the ground voltage $V_{GND}$ and is then disconnected from the signal source 20.

Figure 4:
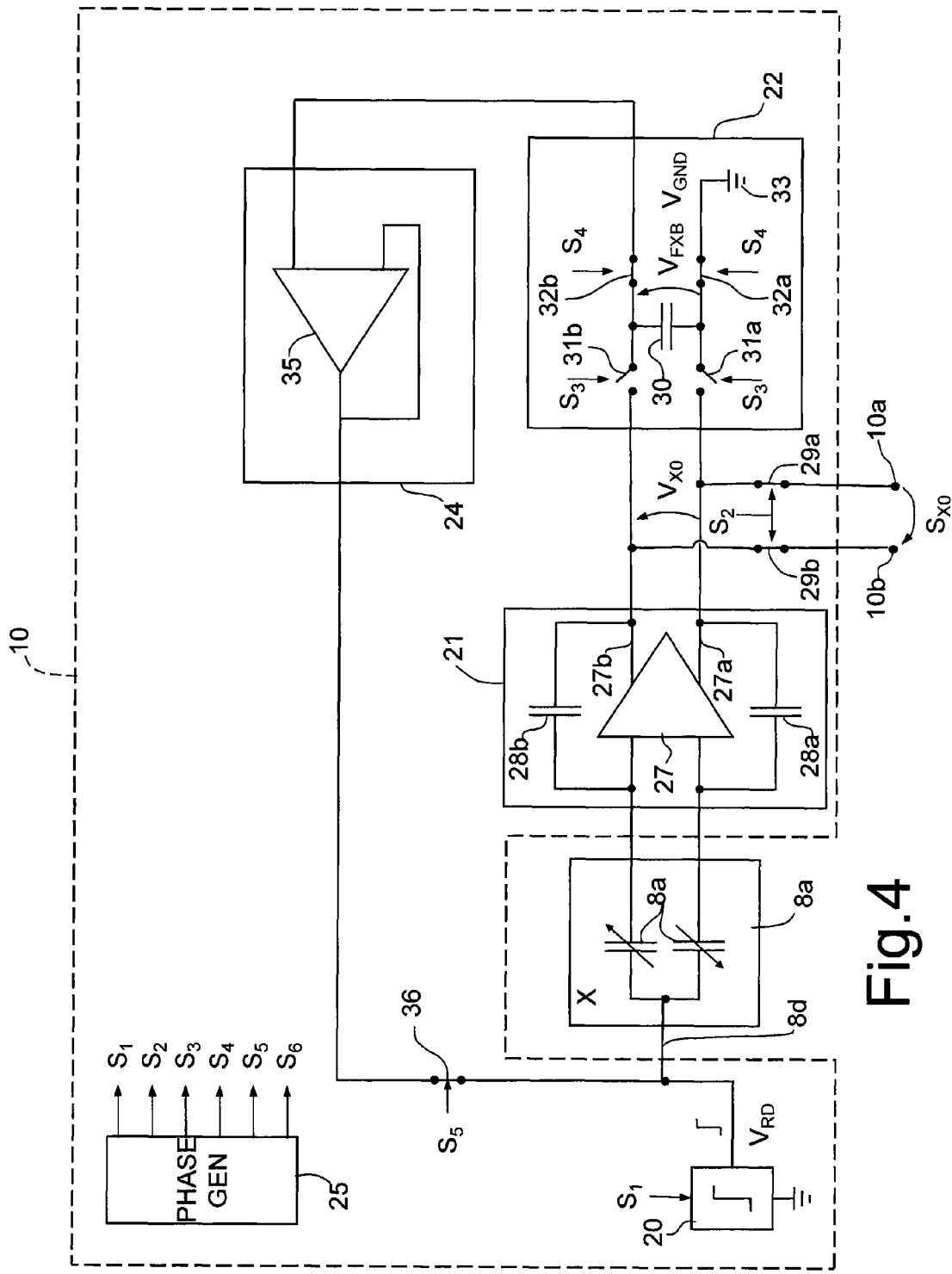

Next, FIG. 4, after the hold switches 31*a*, 31*b* have been opened, the feedback switches 32*a*, 32*b*, 36 are closed for connecting the hold capacitor 30 to the drive terminal 8*d* of the inertial sensor 8. In addition, the output switches 29*a*, 29*b* are closed condition so as to connect the outputs 27*a*, 27*b* of the charge amplifier 27 to the processing stage 11, in particular to the A/D converter 13.

In this way, the feedback voltage $V_{FBX}$ stored on the hold capacitor 30 is applied to the drive terminal 8*d* of the inertial sensor 8, which in practice receives a step voltage of amplitude $V_{FBX}$. In practice, then, the feedback switches 32*a*, 32*b*, 36 and the buffer stage 24 form a feedback-circuit switch that supplies the feedback signal $V_{FBX}$ to the inertial sensor 8 so that the charge amplifier 27 generates in response a detection voltage $V_{XO}$.

More precisely, in response to the feedback voltage $V_{FBX}$, the first pair of capacitors 8*a* of the sensor 8 supplies (or absorbs) differential charges $Q_{AX}'$, $Q_{BX}'$ to (from) the charge amplifier 27, which converts the differential charges $Q_{AX}'$, $Q_{BX}'$ into the detection voltage $V_{XO}$. Also in this case, the detection voltage $V_{XO}$ supplied by the charge amplifier 27 is proportional to the amplitude of the voltage step supplied to the drive terminal 8*d* (i.e., the feedback voltage $V_{FBX}$) and to the capacitance variation $\Delta C_{SX}$ of the first pair of capacitors 8*a*. Consequently, on the basis of Eq. (1) we have $$V_{XO}=K_1*V_{FBX}*\Delta C_{SX}=K_1^2*V_{RD}*\Delta C_{SX}^2 \quad (3)$$

Furthermore, the capacitance variation $\Delta C_{SX}$ of the first pair of capacitors 8*a* is proportional to the acceleration component $A_X$ according to the first detection axis X. On the basis of Eq. (2) we have $$V_{XO}=K_1^2*V_{RD}*(K_2*A_X)^2=K_3*A_X^2 \quad (4)$$

where $K_3$ is a third constant of proportionality. In practice, then, the detection voltage $V_{XO}$ at the end of the second iteration is proportional to the square of the modulus of the acceleration component $A_X$ according to the first detection axis X.

The first detection signal $S_{XO}$ coincides with the detection voltage $V_{XO}$ generated as described above. In the same way, in successive read cycles the reading interface 10 determines the second and third detection signals $S_{YO}$, $S_{ZO}$, which coincide with detection voltages $V_{YO}$, $V_{ZO}$, respectively proportional to the square of the modulus of the acceleration component $A_Y$ according to the second detection axis Y and of the modulus of the acceleration component $A_Z$ according to the third detection axis Z.

Figure 5C:
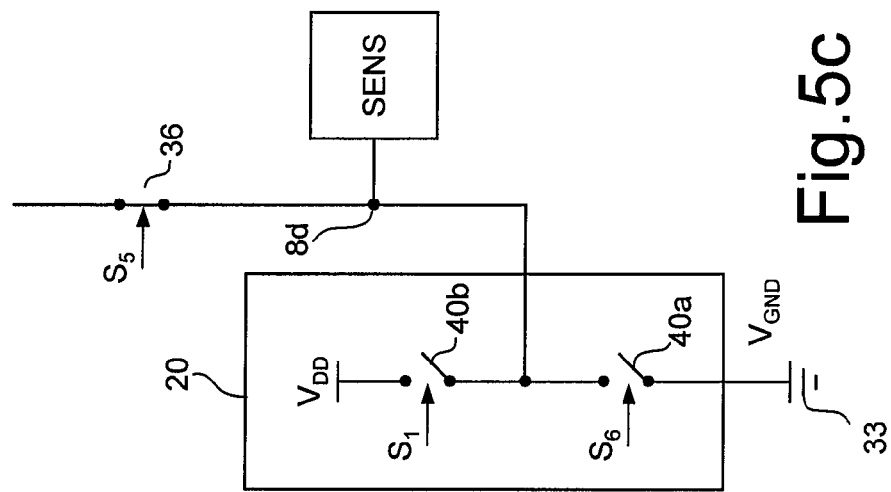
FIGS. 5a-5c are electrical circuit diagrams regarding a detail of FIGS. 3 and 4 in respective operating configurations.
Figure 5B:
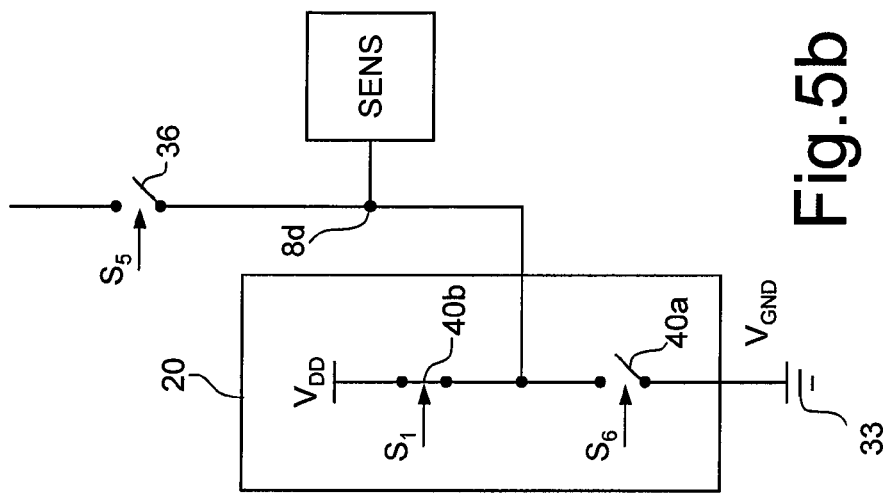
Figure 5A:
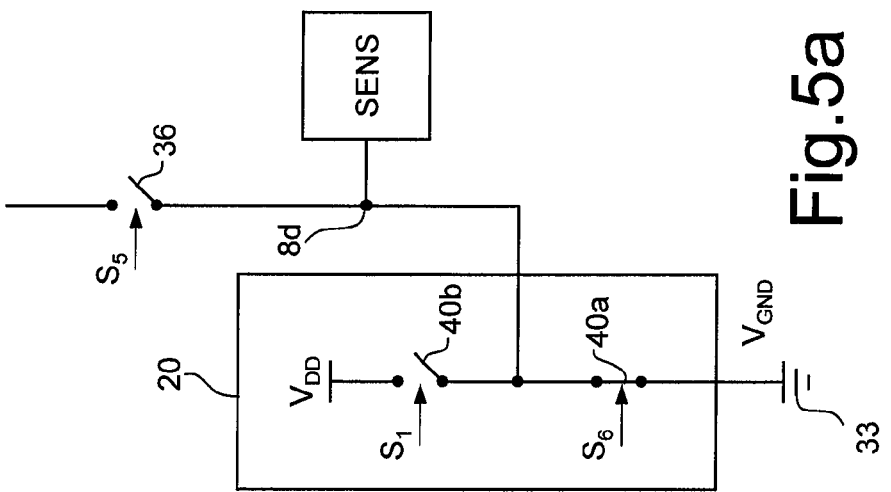

FIGS. 5*a*-5*c* show in greater detail the signal source 20, which, in the embodiment described herein, comprises a supply line 38, supplying a supply voltage $V_{DD}$ and a first read switch 40*a* and a second read switch 40*b*. The first read switch 40*a* is connected to the ground line 33 and to the drive terminal 8*d* and is driven by a sixth clock signal $S_6$. The second read switch 40*b* is connected between the supply line 38 and the drive terminal 8*d* of the inertial sensor 8 and is driven by the first clock signal $S_1$. In practice, during the reset steps reset of the first read iteration and of the second read iteration, the first read switch 40*a* is closed, for connecting the drive terminal 8*d* to the ground line 33, whereas the second read switch 40*b* and the feedback switch 36 are open (FIG. 5*a*).

During the first iteration, once the reset step is terminated, the first and second read switches 40*a*, 40*b* switch (FIG. 5*b*), connecting the drive terminal 8*d* of the inertial sensor 8 to the supply line 38. In this way, the voltage on the drive terminal 8*d* has a step pattern of pre-determined amplitude (the amplitude of the step of read voltage $V_{RD}$ is equal to $V_{DD}$).

At the end of the reset step of the second iteration, instead, the first read switch 40*a* and the feedback switch 36 switch, whereas the second read switch 40*b* remains opened (FIG. 5*c*). The signal source 20 is thus disconnected from the drive terminal 8*d*, which receives the feedback voltage $V_{FBX}$ from the hold capacitor 30 (herein not illustrated).

The free-fall detector and the detection method described are particularly advantageous because they enable calculation of the exact square value of the magnitude of the total acceleration $A_T$ in a rapid and precise way, with a limited use of resources. Making the comparison on the value of the magnitude squared instead of on the first power obviously does not limit the precision. On the other hand, envisaging a second reading iteration, in which the inertial sensor is driven by a voltage intrinsically correlated to the capacitance variations, enables having immediately available the squares of the moduli of the acceleration components $A_X$, $A_Y$, $A_Z$ according to the detection axes X, Y, Z, without any need to carry out burdensome operations of raising to a power. Free-fall condition signaling can thus be accomplished in an extremely timely way, without sacrificing the precision and at the same time preventing the problem of false positives.

Figure 6:
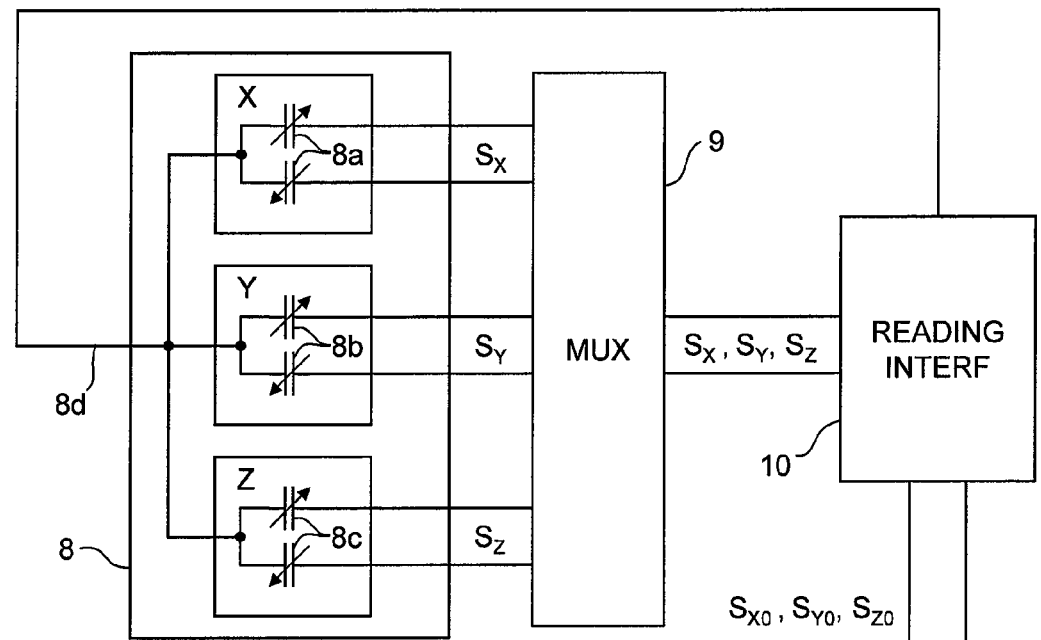
FIG. 6 is a simplified electrical circuit diagram of a free-fall detector device in accordance with a second embodiment of the present invention.
Figure 6:
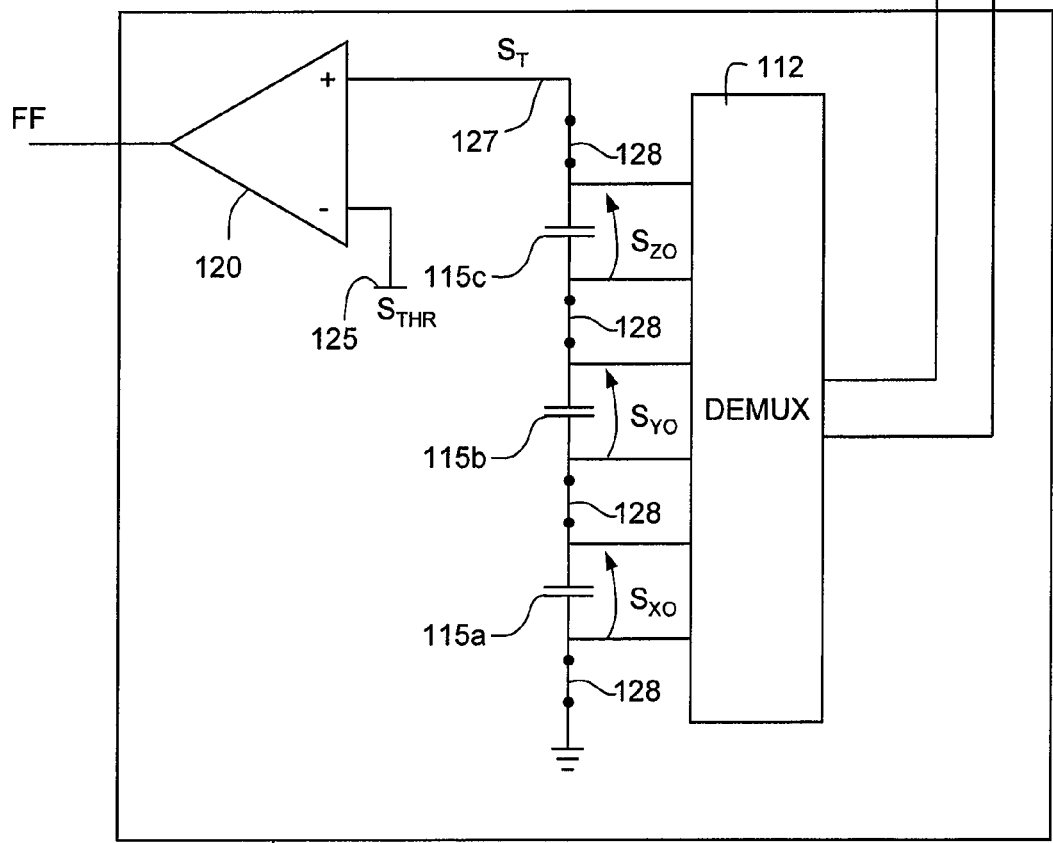

FIG. 6, in which parts that are the same as those already illustrated are designated by the same reference numbers, shows a second embodiment of the invention. In this case, a free-fall detector 100 comprises the inertial sensor 8, the reading interface 10, and a fully analog processing stage 111. In greater detail, the processing stage 111 comprises a demultiplexer 112, a first memory capacitor 115*a*, a second memory capacitor 115*b*, and a third memory capacitor 155*c*, a comparator 120 and a reference line 125 supplying a reference threshold signal $S_{THR}$. The first, second, and third memory capacitors 115*a*, 115*b*, 115*c* are selectively and sequentially connectable to the outputs 10*a*, 10*b* of the reading interface 10 by the demultiplexer 112 for receiving, respectively, the first, second and third detection signals $S_{XO}$, $S_{YO}$, $S_{ZO}$, which are proportional to the square of the moduli of the acceleration components detected by the inertial sensor 8 according to the first, second, and third detection axes X, Y, Z, respectively, as in the example illustrated previously with reference in particular to FIGS. 2 and 4. In addition, The first, second, and third memory capacitors 115*a*, 115*b*, 115*c* are connectable in series between the ground line 33 and a comparison terminal 127 by comparison switches 128, driven simultaneously.

The comparator 120 has a non-inverting input connected to the comparison terminal 127 and an inverting input connected to the reference line 125, for receiving the reference threshold signal $S_{THR}$. Furthermore, the comparator 120 supplies the free-fall signal FF on its output.

Once the first, second, and third detection signals $S_{XO}$, $S_{YO}$, $S_{ZO}$ have been sequentially stored on the first, second, and third memory capacitors 115*a*, 115*b*, 115*c*, the comparison switches 128, initially open, are closed. On the comparison terminal 127 there is then an addition signal $S_T$ equal to the sum of the first, second, and third detection signals $S_{XO}$, $S_{YO}$, $S_{ZR}$. The addition signal ST is moreover correlated to the square of the magnitude of the detected total acceleration of the free-fall detector 100 since the first, second, and third detection signals $S_{XO}$, $S_{YO}$, $S_{ZO}$ are proportional to the square of the moduli of the acceleration components detected by the inertial sensor 8, respectively, according to the first, second, and third detection axes X, Y, Z.

The free-fall detector 100 directly adds the analog electrical signals corresponding to the acceleration components according to the detection axes without converting them into numeric signals. The response of the free-fall detector 100 is hence particularly fast and, moreover, its structure is extremely compact.

Figure 7:
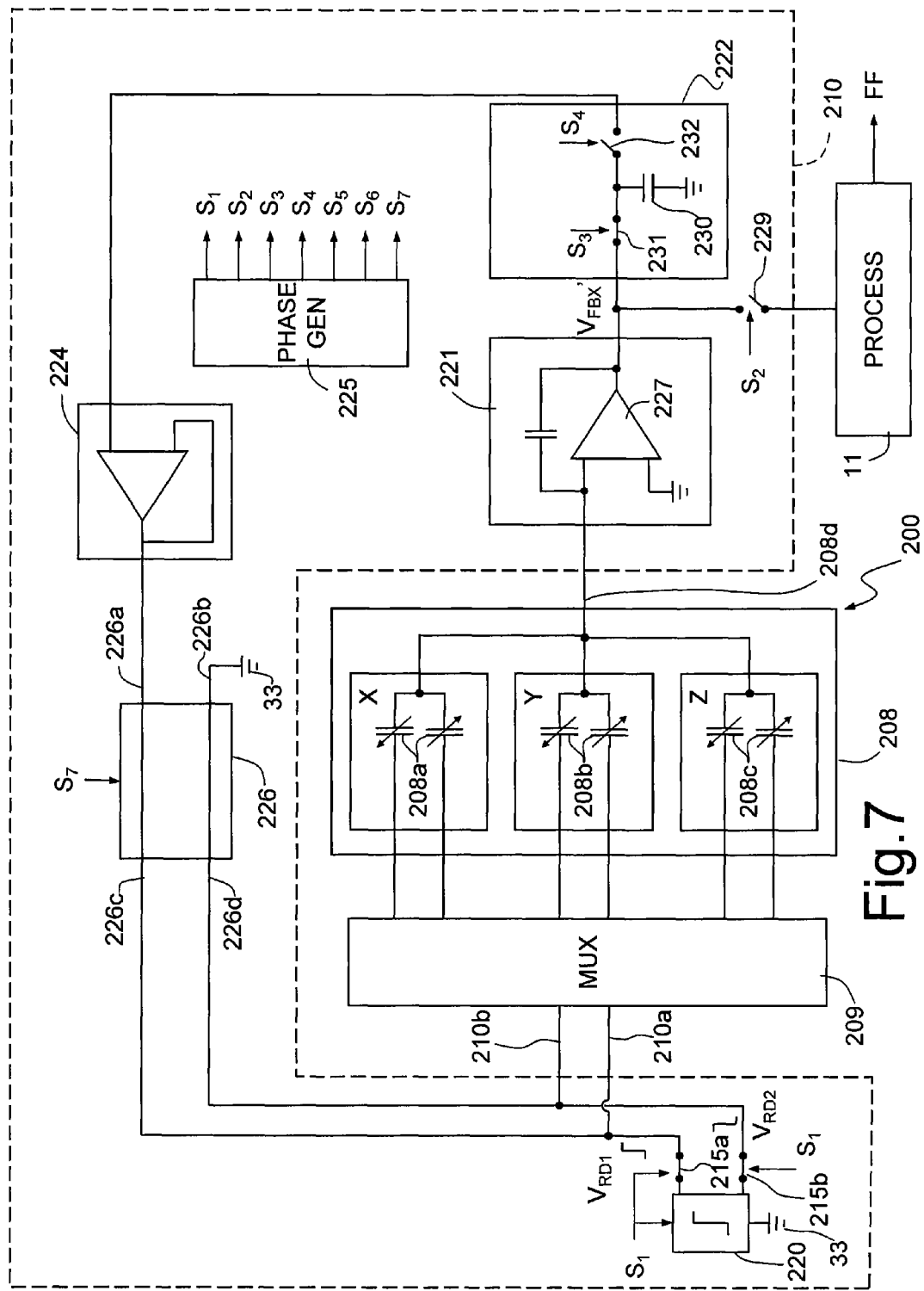
FIGS. 7 and 8 are simplified electrical circuit diagrams of a free-fall detector device in accordance with a third embodiment of the present invention, in a first and, respectively, a second operating configuration.
Figure 8:
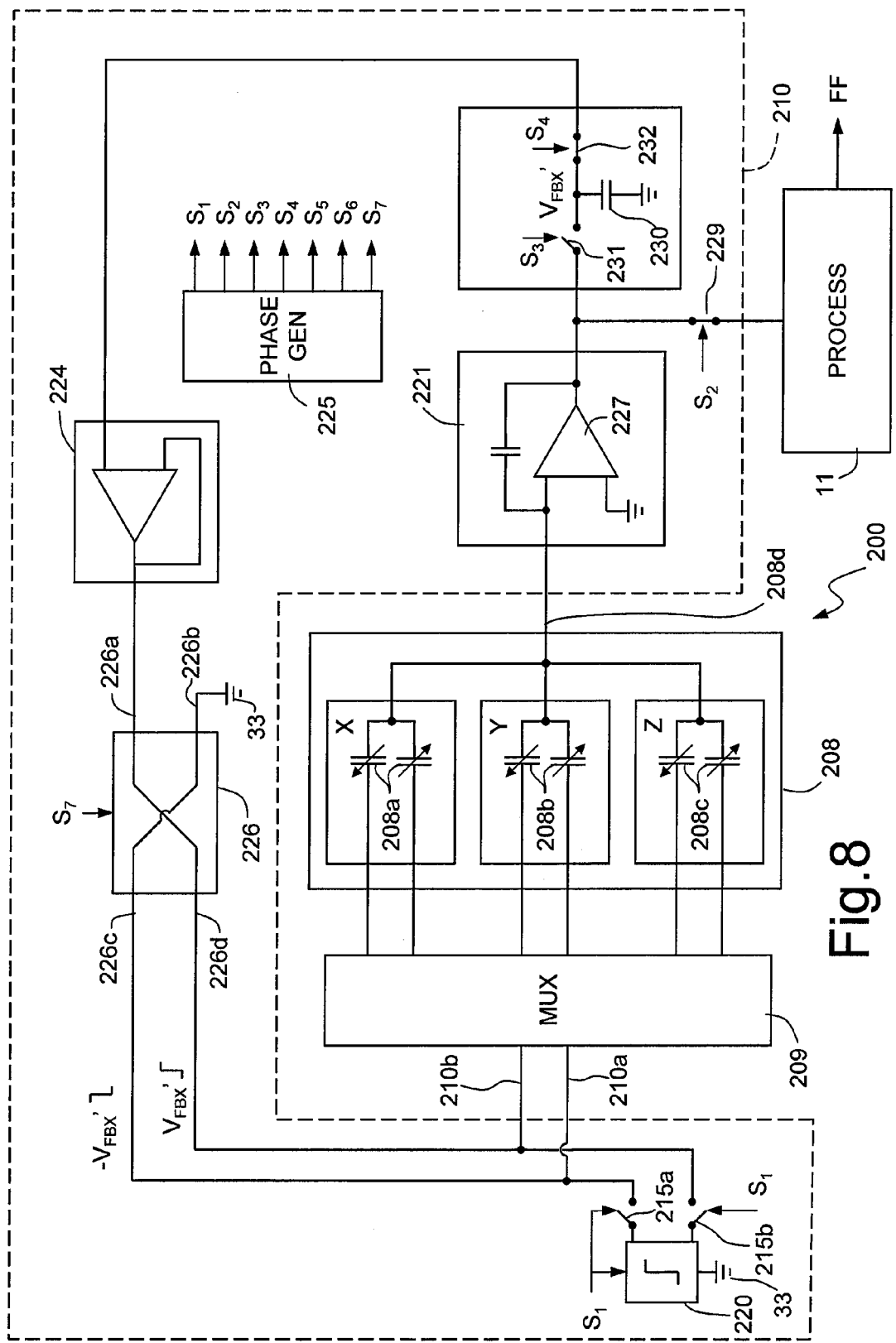

FIGS. 7 and 8, in which parts already illustrated are again designated by the same reference numbers, show a third embodiment of the invention.

In this case, a free-fall detector 200 comprises an inertial sensor 208, a multiplexer 209, a reading interface 210, and the processing stage 11.

The inertial sensor 208 is again a linear accelerometer of a capacitive MEMS type with mutually perpendicular and independent first, second, and third detection axes X, Y, Z. In FIG. 7, the inertial sensor 208 is represented schematically by a first, second, and third pair of capacitors 208*a*, 208*b*, 208*c* having variable capacitance in response to forces and accelerations acting on the inertial sensor 8 according to the first, second, and third detection axes X, Y, Z, respectively.

In this case, each pair of capacitors 208*a*, 208*b*, 208*c* has a terminal in common, connected to a detection terminal 208*d* of the inertial sensor 8, and two driving terminals, selectively and sequentially connectable to driving outputs 210*a*, 210*b* of the reading interface 210 through the multiplexer 209. The detection terminal 208*d* is, instead, connected to an input of the reading interface 210. The inertial sensor 208 is configured for having differential driving and single-ended reading.

The reading interface 210 comprises a signal source 220, a charge-voltage converter 221, a hold stage 223, a buffer stage 224, a driving stage 226, and a phase-generator circuit 225.

The signal source 220, of a known type, is configured for supplying a first differential driving step voltage $V_{RD1}$ and a second differential driving step voltage $V_{RD2}$, of equal amplitude and opposite sign. The differential driving voltages $V_{RD1}$, $V_{RD2}$ are supplied on the first driving output 210*a* and on the second driving output 210*b* of the reading interface 210, to which the signal source 220 is selectively connectable through driving switches 215*a*, 215*b*. In addition, the signal source 220 is driven by the first clock signal $S_1$, as well as the read switches 215*a*, 215*b*.

The charge-voltage converter 221 comprises a switched-capacitor charge amplifier 227, which has an input connected to the detection terminal 208*d* of the inertial sensor 208. An output of the charge-voltage converter 221 is connected to the hold stage 222 and is selectively connectable to the processing stage 11 by an output switch 229, driven by the second clock signal $S_2$.

The hold stage 222 comprises a hold capacitor 230, selectively connectable to the output of the charge amplifier 227 and to the buffer stage 224 by a hold switch 231 (driven by the third clock signal $S_3$) and, respectively, a feedback switch 233 (driven by the fourth clock signal $S_4$).

The driving stage 226 has a first input 226*a*, connected to the output of the buffer stage 224, a second input connected to the ground line 33, and a first output and a second output, respectively connected to the first output 210*a* and to the second output 210*b* of the reading interface 210. The driving stage 226 has a first configuration, in which the first input 226*a* is connected to the first output 210*a*, and the second input 226*b* is connected to the second output 210*b* (FIG. 7); and a second configuration, in which the first input 226*a* is connected to the second output 210b and the second input 226b is connected to the first output 210a (FIG. 8). Furthermore, the driving stage 226 is driven by a seventh clock signal $S_7$ for switching between the first configuration and the second configuration.

Reading of the inertial sensor 208 envisages two iterations for each detection axis X, Y, Z (FIGS. 7 and 8 refer only to reading of the first detection axis X).

In a first iteration (FIG. 7), the reading interface 210 supplies the first differential driving voltage $V_{RD1}$ and the second differential driving voltage $V_{RD2}$ to the inertial sensor 208. In response, the charge amplifier 227 generates a feedback voltage $V_{FBX}'$, which is stored on the hold capacitor 230. The feedback voltage $V_{FBX}'$ is proportional to the amplitude of the first differential driving step voltage $V_{RD1}$ and of the second differential driving step voltage $V_{RD2}$ and to the capacitance variation $\Delta C_{SX}$ of the first pair of capacitors 208a of the inertial sensor 208.

In a second iteration, the hold capacitor is disconnected from the charge amplifier 227 and connected to the first input 226a of the driving stage 226 through the feedback switch 232 and the buffer stage 224.

After the voltage on the first input 226a of the driving stage 226 is stabilized at the value of the feedback voltage $V_{FBX}'$, the driving stage 226 switches from the first configuration to the second configuration. Switching of the driving stage 226 causes a first voltage step and a second voltage step, of amplitude equal to the feedback voltage $V_{FBX}'$ and of opposite sign, on the outputs 210a, 210b of the reading interface 210. In practice, then, the feedback switch 32, the buffer stage 224, and the driving stage 226 form a feedback circuit switch that supplies the feedback signal $V_{FBX}'$ to the inertial sensor 208.

For the reasons given previously with reference to Eqs. (1)-(4), the charge amplifier 227 generates in response an output voltage $V_{XO}$ that is proportional to the square of the capacitance variation $\Delta C_{SX}$ of the first pair of capacitors 208a of the inertial sensor 208 and hence to the square of the modulus of the acceleration component $A_X$ according to the first detection axis X.

Finally, it is evident that modifications and variations can be made to the device and to the method described herein, without thereby departing from the scope of the present invention as defined in the annexed claims.

The invention claimed is:

1. A free-fall detector device, comprising:
    an inertial sensor;
    an integrated charge circuit coupled to said inertial sensor;
    a signal source, configured to supply a read signal to said inertial sensor;
    a storage element, selectively connectable to an output of said integrated charge circuit and configured to store a feedback signal generated by said integrated charge circuit in response to said read signal supplied to said inertial sensor; and
    a feedback circuit coupled to said storage element and configured to supply said feedback signal to said inertial sensor, said integrated charge circuit configured to generate at least one detection signal in response to said feedback signal supplied to said inertial sensor.

2. The device according to claim 1, wherein said inertial sensor comprises first, second, and third detection elements responding to loads oriented, respectively, according to first, second, and third independent detection axes, and said integrated charge circuit is selectively connectable to said first, second, and third detection elements for generating first, second, and third detection signal, respectively correlated to loads oriented, respectively, according to the first, second, and third detection axes.

3. The device according to claim 2, comprising an adder circuit for adding said first, second, and third detection signal.

4. The device according to claim 3, comprising a comparator, associated to said adder circuit for comparing an addition signal, generated by said adder circuit, with a reference signal.

5. The device according to claim 1, comprising at least one hold selective-connection element and at least one feedback selective-connection element controlled so as to connect said storage element to said integrated charge circuit in a first operating configuration and to said inertial sensor in a second operating configuration.

6. The device according to claim 1, wherein said storage element comprises at least one capacitor.

7. The device according to claim 1, wherein said integrated charge circuit comprises a charge-voltage converter.

8. The device according to claim 7, wherein said charge-voltage converter comprises a charge integrator.

9. The device according to claim 8, wherein said charge integrator is a selectively connectable capacitive feedback charge integrator.

10. The device according to claim 8, wherein said charge integrator is fully differential.

11. The device according to claim 1, wherein said read signal comprises a step voltage.

12. A free-fall detection method, comprising:
    supplying a read signal to an inertial sensor;
    storing a differentially integrated feedback signal, generated by said inertial sensor in cooperation with an integrated charge circuit in response to said read signal;
    supplying said feedback signal to said inertial sensor; and
    generating at least one detection signal by said inertial sensor in cooperation with the integrated charge circuit in response to said feedback signal.

13. The method according to claim 12, comprising generating first, second, and third detection signals, respectively correlated to loads, oriented, respectively, according to first, second, and third detection axes.

14. The method according to claim 13, comprising adding said first, second, and third detection signals together.

15. The method according to claim 14, comprising comparing a sum of said first, second, and third detection signals with a reference value.

16. The method according to claim 12, wherein said step of storing comprises coupling a storage element to at least one output of said inertial sensor.

17. The method according to claim 16, wherein said step of supplying said feedback signal comprises coupling said storage element to at least one drive terminal of said inertial sensor.

18. The method according to claim 12, wherein said read signal comprises a step voltage.

19. The method according to claim 12, further comprising converting the feedback signal generated by the inertial sensor from a charge to a voltage signal prior to storing the feedback signal.

20. The method according to claim 12, wherein said storing includes storing the feedback signal in a storage element during a first phase during which the storage element is disconnected from an input of the inertial sensor and the step of supplying the feedback signal includes supplying the feedback signal during a second phase during which the storage element is disconnected from an output of the inertial sensor.

21. A portable electronic device, comprising:
a control unit structured to control the portable electronic device; and
a free-fall detector device coupled to the control unit and including:
   an inertial sensor;
   an integrated charge circuit associated to said inertial sensor;
   a signal source, configured to supply a read signal to said inertial sensor;
   a storage element, selectively connectable to an output of said integrated charge circuit and configured to store a feedback signal generated by said integrated charge circuit in response to said read signal supplied to said inertial sensor; and
   a feedback circuit coupled to said storage element and configured to supply said feedback signal to said inertial sensor, so that said integrated charge circuit generates at least one detection signal in response to said feedback signal supplied to said inertial sensor.

22. The portable electronic device according to claim 21, wherein said inertial sensor comprises first, second, and third detection elements responding to loads oriented, respectively, according to first, second, and third independent detection axes, and said integrated charge circuit is selectively connectable to said first, second, and third detection elements for generating first, second, and third detection signal, respectively correlated to loads oriented, respectively, according to the first, second, and third detection axes.

23. The portable electronic device according to claim 22, wherein the free-fall detector device includes an adder circuit for adding said first, second, and third detection signal.

24. The portable electronic device according to claim 23, wherein the free-fall detector device includes a comparator, associated to said adder circuit for comparing an addition signal, generated by said adder circuit, with a reference signal.

25. The portable electronic device according to claim 21, wherein the free-fall detector device includes at least one hold selective-connection element and at least one feedback selective-connection element controlled so as to connect said storage element to said integrated charge circuit in a first operating configuration and to said inertial sensor in a second operating configuration.

26. The portable electronic device according to claim 21, wherein said storage element comprises at least one capacitor.

27. The portable electronic device according to claim 21, wherein said integrated charge circuit comprises a charge-voltage converter.

28. The portable electronic device according to claim 21, wherein said read signal comprises a step voltage.

29. The portable electronic device according to claim 21, further comprising an operative element sensitive to free-falling, wherein the control unit is structured to suspend operation of the operative element in response to receiving, from the free-fall detector device, a free-fall signal indicating that the device is free-falling.

* * * * *